United States Patent
Sun et al.

(10) Patent No.: US 12,038,366 B2
(45) Date of Patent: Jul. 16, 2024

(54) DETECTION DEVICE AND METHOD FOR TINY PARTICLES IN LIQUID

(71) Applicants: JIANGSU SUJING GROUP CO., LTD., Jiangsu (CN); SUJING GROUP AUTOMATION INSTRUMENT EQUIPMENT CORPORATION, Jiangsu (CN)

(72) Inventors: Jiyong Sun, Jiangsu (CN); Fengfei Liang, Jiangsu (CN); Weidong Shen, Jiangsu (CN)

(73) Assignees: JIANGSU SUJING GROUP CO., LTD., Jiangsu (CN); SUJING GROUP AUTOMATION INSTRUMENT EQUIPMENT CORPORATION, Jiangsu (CN)

( * ) Notice: Subject to any disclaimer, the term of this patent is extended or adjusted under 35 U.S.C. 154(b) by 252 days.

(21) Appl. No.: 17/777,641

(22) PCT Filed: Dec. 3, 2019

(86) PCT No.: PCT/CN2019/122600
§ 371 (c)(1),
(2) Date: May 18, 2022

(87) PCT Pub. No.: WO2021/097910
PCT Pub. Date: May 27, 2021

(65) Prior Publication Data
US 2022/0412865 A1 Dec. 29, 2022

(30) Foreign Application Priority Data

Nov. 19, 2019 (CN) .......................... 201911132480.6

(51) Int. Cl.
*G01N 15/0205* (2024.01)

(52) U.S. Cl.
CPC ................. *G01N 15/0211* (2013.01)

(58) Field of Classification Search
CPC ........... G01N 15/0211; G01N 15/0205; G01N 2015/0053; G01N 2015/1493;
(Continued)

(56) References Cited

U.S. PATENT DOCUMENTS

| 7,709,821 | B2 * | 5/2010 | Casstevens | ........ | G01N 15/1433 |
| | | | | | 250/573 |
| 2011/0192991 | A1 * | 8/2011 | Fukumoto | .......... | G01N 15/1429 |
| | | | | | 250/459.1 |
| 2019/0353578 | A1 * | 11/2019 | Polyakov | ........... | G01N 15/1459 |

FOREIGN PATENT DOCUMENTS

| CN | 102288523 A | 12/2011 |
| CN | 202305367 U | 7/2012 |

(Continued)

OTHER PUBLICATIONS

International Search Report for PCT/CN2019/122600, mailing date: Aug. 28, 2020.

*Primary Examiner* — Jonathan M Hansen
(74) *Attorney, Agent, or Firm* — Schmeiser, Olsen & Watts, LLP

(57) ABSTRACT

A detection device for tiny particles in a liquid is provided. The detection device includes a flow cell, a laser, a scattered light collection device, a photoelectric detector, a fiber Bragg grating and a first optical fiber coupler, wherein scattered light collected by the scattered light collection device is sent to the fiber Bragg grating through the first optical fiber coupler, and reflected light of the fiber Bragg grating after receiving the scattered light is sent to the photoelectric detector through the first optical fiber coupler. The device can eliminate most scattered light generated by the liquid, and reduce the interference of the scattered light of the liquid to scattered light signals generated by the (Continued)

particles, so that the scattered light signals captured by the photoelectric detector are mainly light signals generated by the particles.

13 Claims, 1 Drawing Sheet

(58) Field of Classification Search
CPC ........... G01N 15/1434; G01N 15/1459; G01N 2015/1486; G01N 15/10
See application file for complete search history.

(56) References Cited

FOREIGN PATENT DOCUMENTS

| | | |
|---|---|---|
| CN | 106018206 A | 10/2016 |
| CN | 109724901 A | 5/2019 |
| EP | 0586146 A1 | 3/1994 |
| JP | 2009236563 A | 10/2009 |
| WO | 2013189921 A1 | 12/2013 |

* cited by examiner

DETECTION DEVICE AND METHOD FOR TINY PARTICLES IN LIQUID

CROSS-REFERENCE TO RELATED APPLICATIONS

This application claims priority to PCT Application No. PCT/CN2019/122600, having a filing date of Dec. 3, 2019, which claims priority to CN Application No. 201911132480.6, having a filing date of Nov. 19, 2019, the entire contents both of which are hereby incorporated by reference.

FIELD OF TECHNOLOGY

The following relates to the field of detection devices for particles in liquid, particularly to a detection device for tiny particles in liquid.

BACKGROUND

A counter for particles in liquid is mainly used to detect tiny particle contaminants in liquid. It has important applications in semiconductor process control, and is used to detect the cleanliness of ultrapure water or chemical reagents. Light scattering is a main detection method currently used in the counter for particles in liquid.

When incident light strikes the particles, the tiny particles would interact with the incident light to generate scattered light, and the strength of the scattered light is related to the size of the particles. Therefore, the size of the particles can be measured according to the strength of the scattered light signal, and the quantity of the particles would be counted.

Since the diameters of the tiny particles in the measured liquid are very small, usually below 1 micron, the scattered light generated is also very faint. For the counter for particles in liquid, when the incident light strikes the tiny particles, it also irradiates the liquid itself, and the liquid itself will generate scattered light, the scattered light generated by the particles will interfere with the scattered light generated by the particles, which seriously restricts the detectability of the system.

SUMMARY

An aspect relates to a detection device and method for tiny particles in liquid, which can eliminate the interference of the liquid to the detection results.

To achieve the above aspect, the technical solution employed by the present disclosure is a detection device for tiny particles in liquid, comprises a flow cell provided with a liquid channel inside for liquid to pass through, a laser for generating laser light directed towards the liquid channel, a scattered light collection device for collecting scattered light scattered by the flow cell after being irradiated by a laser beam, and a photoelectric detector, wherein the detection device further comprises a fiber Bragg grating and a first optical fiber coupler, the reflection wavelength of the fiber Bragg grating is the same as the wavelength emitted by the laser, the fiber Bragg grating and the scattered light collection device and the photoelectric detector are connected via the first optical fiber coupler, the scattered light collected by the scattered light collection device is sent to the fiber Bragg grating through the first optical fiber coupler, and reflected light of the fiber Bragg grating after receiving the scattered light is sent to the photoelectric detector through the first optical fiber coupler.

In an embodiment, the flow cell is a cuboid made of transparent material, and the liquid channel is a through hole arranged in the flow cell along its length direction.

In an embodiment, the liquid channel is a circular hole with a diameter ranged from 0.5 to 2 mm.

In an embodiment, the laser beam is injected into the central position of the liquid channel perpendicular to the liquid channel.

In an embodiment, the scattered light collection device comprises a scattered light converging lens and an optical fiber, the scattered light converging lens converges the scattered light to an end of the optical fiber, and the scattered light is collected by the optical fiber.

In an embodiment, the scattered light converging lens is glued on the surface of the flow cell, and the center of the liquid channel of the flow cell is on the object plane of the scattered light converging lens.

In an embodiment, two sets of scattered light collection devices are provided, and the detection device further comprises a second optical fiber coupler for connecting the two sets of scattered light collection devices and the first optical fiber coupler, the scattered light collected by the two sets of scattered light collection devices is combined through the second optical fiber coupler and then sent to the first optical fiber coupler.

In an embodiment, the two sots of scattered light collection devices respectively collect the light scattered from opposite sides of the flow cell.

In an embodiment, the detection device further comprises a light trap for absorbing light, and the light trap is positioned in the emitted direction of the laser beam after passing through the flow cell.

A detection method for tiny particles in liquid, comprises irradiating liquid with laser fight and collecting scattered light, reflecting, the collected scattered light by a fiber Bragg grating of which the reflection wavelength is the same as the wavelength of the laser light and then analyzing the reflected light from the fiber Bragg grating using a photoelectric detector, and calculating the quantity and diameter of the particles according to the reflected light received by the photoelectric detector.

Due to the use of the above technical solutions, the present disclosure has the following advantages over the conventional art.

Monochromatic light of a wavelength of $\lambda$ emitted by a laser converges in the detection area of the flow cell and forms a light spot, and the liquid in the flow cell and the particles in the liquid are irradiated by the illumination light when passing through the detection area, and generate scattered light. According to the light scattering theory, the wavelength of the scattered light generated by the particles is $\lambda$. The scattered light generated by the liquid is divided into three parts, the wavelength of the first part of the light is $\lambda$, the wavelength of the second part of the light is $\lambda 1$ ($\lambda 1 = \lambda + \Delta\lambda$), and the wavelength of the third part of the light is $\lambda 2$ ($\lambda 2 = \lambda - \Delta\lambda$). A scattered light collection device collects the scattered light and transmits it to the fiber Bragg grating through the first optical fiber coupler, wherein the wavelength of the fiber Bragg grating is $\lambda$. Therefore, among the scattered light transmitted to the fiber Bragg grating, only the scattered light of the wavelength of $\lambda$ is reflected and transmitted to the photoelectric detector through the first optical fiber coupler, and then captured by the photoelectric detector. After the scattered light with the wavelength of $\lambda 1$ and the wavelength of $\lambda 2$ generated by the liquid passes through the fiber grating, it is absorbed by a subsequent light trap.

The device can eliminate most scattered light generated by the liquid thereby, and reduce the interference of the scattered light of the liquid to scattered light signals generated by the particles, so that the scattered light signals captured by the photoelectric detector are mainly light signals generated by the particles. The signal-to-noise ratio of the whole detection device is improved. The detection capability of the detection device for detecting tiny particles is enhanced, so that particles with smaller particle size can be detected.

BRIEF DESCRIPTION

Some of the embodiments will be described in detail, with references to the following Figures, wherein like designations denote like members, wherein.

In the figures, 1—laser; 2—light source converging lens; 3—flow cell; 31—liquid channel; 4—photoelectric detector; 5—fiber Bragg grating; 6—first optical fiber coupler; 7—second optical fiber coupler; 8—scattered light converging lens; 9—optical fiber; 10—first light trap.

DETAILED DESCRIPTION

Figure 1:
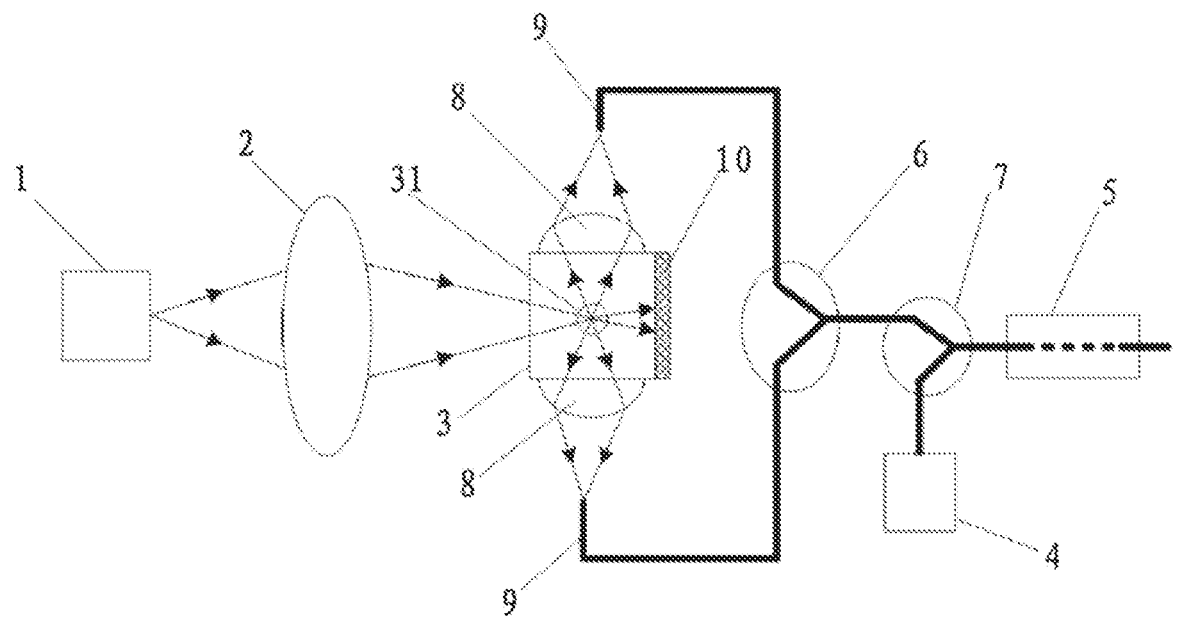
FIG. 1 is a schematic principle diagram of a detection device.

In the following, the present disclosure is further explained in detail combining with specific embodiments shown in the accompanying drawings:

Referring to FIG. 1, a detection device for tiny particles in liquid, comprises a flow cell 3 provided with a liquid channel 31 inside for liquid to pass through, a laser 1 for generating laser light, a light source converging lens 2 for converging light emitted by the laser 1 to the liquid channel 31, a scattered light collection device for collecting scattered light scattered by the flow cell 3 after being irradiated by a laser beam, a photoelectric detector 4, a fiber Bragg grating 5 and a first optical fiber coupler 6; in addition, the detection device further comprises a first light trap 10 for absorbing light, wherein the first light trap 10 is positioned in the emitted direction of the laser beam after passing through the flow cell 3. The reflection wavelength of the fiber Bragg grating 5 is the same as the wavelength emitted by the laser 1, the fiber Bragg grating 5 and the scattered light collection device and the photoelectric detector 4 are connected via the first optical fiber coupler 6, scattered light collected by the scattered light collection device is sent to the fiber Bragg grating 5 through the first optical fiber coupler 6, and reflected light of the fiber Bragg grating 5 after receiving the scattered light is sent to the photoelectric detector 4 through the first optical fiber coupler 6, and the scattered light passing through the fiber Bragg grating 5 is absorbed through a second light trap (not shown in the figures).

In this embodiment, the monochromatic light of a wavelength of $\lambda$ emitted by the laser 1 converges in the detection area of the flow cell 3 and forms a light spot, and the liquid in the flow cell 3 and the particles in the liquid are irradiated by the illumination light when passing through the detection area, and generate scattered light. According to the light scattering theory, the wavelength of the scattered light generated by the particles is $\lambda$. The scattered light generated by the liquid is divided into three parts, the wavelength of the first part of the light is $\lambda$, the wavelength of the second part of the light is $\lambda 1$ ($\lambda 1 = \lambda + \Delta\lambda$), and the wavelength of the third part of the light is $\lambda 2$ ($\lambda 2 = \lambda + \Delta\lambda$). A scattered light collection device collects the scattered light and transmits it to the fiber Bragg grating 5 through the first optical fiber coupler 6, wherein the wavelength of the fiber Bragg grating is $\lambda$. Therefore, among the scattered light transmitted to the fiber Bragg grating, only the scattered light of the wavelength of $\lambda$ is reflected and transmitted to the photoelectric detector 4 through the first optical fiber coupler 6, and then captured by the photoelectric detector. After the scattered light with the wavelength of $\lambda 1$ and the wavelength of $\lambda 2$ generated by the liquid passes through the fiber grating, it is captured by a subsequent second light trap. Finally, the quantity and diameter of the particles are calculated according to the reflected light received by the photoelectric detector 4. The signal-to-noise ratio of the device in this embodiment is improved by filtering the scattered light with the wavelength of $\lambda 1$ and the wavelength of $\lambda 2$ through the Bragg grating. The detection capability of the detection device for detecting tiny particles is enhanced, so that particles with smaller particle can be detected.

Figure 2:
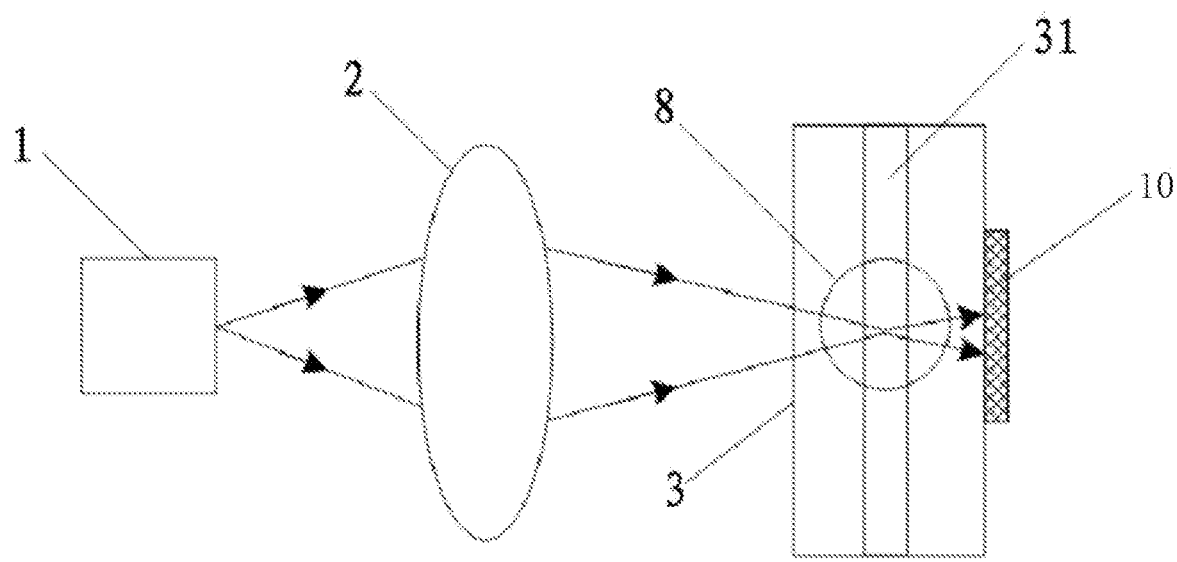
FIG. 2 is a schematic diagram of a side view of a flow cell.

Referring to FIG. 1 and FIG. 2, in this embodiment, in order to facilitate the acquisition of scattered light, the flow cell 3 is a cuboid made of transparent material, and the liquid channel 31 is a through hole arranged in the flow cell 3 along its length direction. Specifically, the liquid channel 31 is a circular hole with a diameter ranged from 0.5 to 2 mm. The laser beam is injected into the central position of the liquid channel 31 perpendicular to a side of the flow cell 3 and to the liquid channel 31, and forms a detection light spot in the liquid channel 31. The laser beam being injected perpendicular to the flow cell 3 can make the scattered light more uniform, and improve the accuracy of scattered light detection to a certain extent.

In this embodiment, the scattered light collection device comprises a scattered light converging lens 8 and an optical fiber 9, the optical axes of the scattered light converging lens 8 and the optical axes of the light source converging lens 2 are arranged perpendicular to each other, and the scattered light converging lens 8 converges the scattered light to an end of the optical fiber 9, and the scattered light is collected by the optical fiber 9. Specifically, the scattered light converging lens 8 is glued on the surface of the flow cell 3, and the center of the liquid channel of the flow cell 3 is on the object plane of the converging lens, so that the installation of the scattered light converging lens 8 is convenient, the scattered light can be better converged, and the accuracy of detection is improved.

As shown in FIG. 1, in this embodiment, in order to improve the collection efficiency of the scattered light, two sets of scattered light collection devices are provided, and the two sets of scattered light collection devices respectively collect the light scattered from opposite sides of the flow cell 3. The detection device further comprises a second optical fiber coupler 7 for connecting the two sets of scattered light collection devices and the first optical fiber coupler 6, the scattered light collected by the two sets of scattered light collection devices is combined through the first optical fiber coupler 6 and then sent into the second optical fiber coupler 7. Moreover, due to that the scattered light from two opposite sides is collected, the scattered light after coupling has a better synchronization effect and higher detection accuracy.

The device can eliminate most scattered light generated by the liquid, and reduce the interference of the scattered light of the liquid to scattered light signals generated by the particles, so that the scattered light signals captured by the photoelectric detector 4 are mainly light signals generated by the particles. The signal-to-noise ratio of the whole detection device is improved. The detection capability of the detection device for detecting tiny particles is enhanced, so that particles with smaller particle size can be detected.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A detection device for tiny particles in liquid, comprising:
   a flow cell provided with a liquid channel inside for liquid to pass through;
   a laser for generating laser light directed towards the liquid channel,
   a scattered light collection device for collecting scattered light scattered by the flow cell after being irradiated by a laser beam;
   a photoelectric detector; and
   a fiber Bragg grating and a first optical fiber coupler, wherein a reflection wavelength of the fiber Bragg grating is the same as a wavelength emitted by the laser, the fiber Bragg grating and the scattered light collection device and the photoelectric detector are connected via the first optical fiber coupler,
   wherein the scattered light collected by the scattered light collection device is sent to the fiber Bragg grating through the first optical fiber coupler, and reflected light of the fiber Bragg grating after receiving the scattered light is sent to the photoelectric detector through the first optical fiber coupler.

2. The detection device for tiny particles in liquid according to claim 1, wherein the flow cell is a cuboid made of a transparent material, and the liquid channel is a through hole arranged in the flow cell along a length direction.

3. The detection device for tiny particles in liquid according to claim 2, wherein the liquid channel is a circular hole with a diameter between 0.5 mm and 2 mm.

4. The detection device for tiny particles in liquid according to claim 2, wherein the laser beam is injected into a central position of the liquid channel perpendicular to the liquid channel.

5. The detection device for tiny particles in liquid according to claim 2, wherein the scattered light collection device comprises a scattered light converging lens and an optical fiber, the scattered light converging lens converges the scattered light to an end of the optical fiber, and the scattered light is collected by the optical fiber.

6. The detection device for tiny particles in liquid according to claim 5, wherein the scattered light converging lens is glued on a surface of the flow cell, and a center of the liquid channel of the flow cell is on an object plane of the scattered light converging lens.

7. The detection device for tiny particles in liquid according to claim 5, further comprising a light source converging lens for converging light generated by the laser to the liquid channel, and optical axes of the light source converging lens and optical axes of the scattered light converging lens are perpendicular to each other.

8. The detection device for tiny particles in liquid according to claim 2, wherein two sets of scattered light collection devices are provided, and the detection device further comprising a second optical fiber coupler for connecting the two sets of scattered light collection devices and the first optical fiber coupler, scattered light collected by the two sets of scattered light collection devices is combined through the second optical fiber coupler and then sent into the first optical fiber coupler.

9. The detection device for tiny particles in liquid according to claim 8, wherein the two sets of scattered light collection devices respectively collect the light scattered from opposite sides of the flow cell.

10. The detection device for tiny particles in liquid according to claim 1, wherein the detection device further comprises a first light trap for absorbing light, and the first light trap is positioned in an emitted direction of the laser beam after passing through the flow cell.

11. The detection device for tiny particles in liquid according to claim 1, wherein the detection device further comprises a second light trap for absorbing light passing through the fiber Bragg grating.

12. The detection device for tiny particles in liquid according to claim 1, wherein:
   the flow cell is a cuboid made of a transparent material, and the liquid channel is a through hole arranged in the flow cell along a length direction;
   the liquid channel is a circular hole with a diameter between 0.5 mm and 2 mm;
   the laser beam is injected into a central position of the liquid channel perpendicular to the liquid channel;
   the scattered light collection device comprises a scattered light converging lens and an optical fiber, the scattered light converging lens converges the scattered light to an end of the optical fiber, and the scattered light is collected by the optical fiber;
   the scattered light converging lens is glued on a surface of the flow cell, and a center of the liquid channel of the flow cell is on an object plane of the scattered light converging lens;
   the detection device comprises a light source converging lens converging light generated by the laser to the liquid channel, and optical axes of the light source converging lens and optical axes of the scattered light converging lens are perpendicular to each other;
   two sets of scattered light collection devices are provided, and the detection device further comprises a second optical fiber coupler for connecting the two sets of scattered light collection devices and the first optical fiber coupler, scattered light collected by the two sets of scattered light collection devices is combined through the second optical fiber coupler and then sent into the first optical fiber coupler;
   the two sets of scattered light collection devices respectively collect the light scattered from opposite sides of the flow cell; the detection device further comprises a first light trap for absorbing light, and the first light trap is positioned in the emitted direction of the laser beam after passing through the flow cell; and
   the detection device comprises a second light trap for absorbing light passing through the fiber Bragg grating.

13. A detection method for tiny particles in liquid, comprising:
   irradiating liquid with laser light and collecting scattered light;
   reflecting the collected scattered light by a fiber Bragg grating of which a reflection wavelength is the same as a wavelength of the laser light;
   analyzing the reflected light from the fiber Bragg grating using a photoelectric detector; and calculating a quantity and a diameter of particles according to the reflected light received by the photoelectric detector.

* * * * *